United States Patent
Thompson

(10) Patent No.: US 12,509,179 B2
(45) Date of Patent: Dec. 30, 2025

(54) MID CONTROL APPARATUS

(71) Applicant: Hawg Halters, Inc., Dahlonega, GA (US)

(72) Inventor: John Mark Thompson, Dahlonega, GA (US)

(73) Assignee: Hawg Halters, Inc., Dahlonega, GA (US)

( * ) Notice: Subject to any disclaimer, the term of this patent is extended or adjusted under 35 U.S.C. 154(b) by 0 days.

(21) Appl. No.: 17/823,343

(22) Filed: Aug. 30, 2022

(65) Prior Publication Data
US 2024/0067298 A1 Feb. 29, 2024

(51) Int. Cl.
| | |
|---|---|
| *B62L 3/04* | (2006.01) |
| *B62J 25/06* | (2020.01) |
| *B62K 23/08* | (2006.01) |
| *B62M 25/06* | (2006.01) |
| *F16H 57/031* | (2012.01) |

(52) U.S. Cl.
CPC .............. *B62L 3/04* (2013.01); *B62J 25/06* (2020.02); *B62K 23/08* (2013.01); *B62M 25/06* (2013.01); *F16H 57/031* (2013.01)

(58) Field of Classification Search
CPC ......... B62K 23/08; B62M 25/06; B62M 7/02; F16D 67/04; F16D 2025/081; B62L 3/04; B60T 11/16
See application file for complete search history.

(56) References Cited

U.S. PATENT DOCUMENTS

| | | | | |
|---|---|---|---|---|
| 7,040,442 | B2 * | 5/2006 | McWhorter | B62K 23/08 |
| | | | | 180/219 |
| D539,198 | S * | 3/2007 | Sands | D12/179 |
| 9,010,793 | B1 * | 4/2015 | Lindholm | B62K 23/08 |
| | | | | 180/218 |
| 10,569,826 | B1 * | 2/2020 | Shaffir | B62K 19/38 |
| 2012/0223505 | A1 * | 9/2012 | Ikeda | B62J 25/04 |
| | | | | 280/291 |
| 2021/0122441 | A1 * | 4/2021 | Eder | B62K 23/08 |

OTHER PUBLICATIONS

Harley-Davidson Mid-Control Kit (Part No. 50502136) (Year: 2021).*
Wayback Machine showing published date. (Year: 2021).*
Prism Supply | DIY | Harley-Davidson Sportster Mid-Control Kit Install video (publicly available at https://www.youtube.com/watch?v=UIWf9NojuEc); uploaded Mar. 11, 2021. Elements relating to a "first mid-control device" are shown at 7:06. Elements of a "second mid-control device" are shown at 8:52. (Year: 2021).*

* cited by examiner

*Primary Examiner* — Randell J Krug
(74) *Attorney, Agent, or Firm* — IceMiller LLP

(57) ABSTRACT

A mid-control system for a motor vehicle having a transmission and a primary cover opposite said transmission, said mid-control system with a first mid-control device connected to the transmission, the first mid-control device including a first footrest engaged with a first actuator pedal, said first actuator pedal connected to at least one fluid reservoir containing a fluid and a second mid-control device connected to the primary cover, the second mid-control device including a pivot shaft, a second footrest engaged with a second actuator pedal and a cover plate.

18 Claims, 24 Drawing Sheets

MID CONTROL APPARATUS

BACKGROUND

The present disclosure relates to a vehicle clutch and brake systems and associated foot controls. Motorcycles and vehicles often include a frame with foot rests, floorboards, or runners for the operator's feet. In some vehicles, these foot rests, floorboards, or runners are solely for resting the operator's feet. In other vehicles, foot rests, floorboards, or runners are equipped with certain devices for controlling functions of the vehicle such as braking, gear shifting, or accelerating. These foot rests, floorboards, or runners are often mounted directly to the frame of the vehicle and foot controls extend from the foot rests, floorboards, or runners or are separately mounted in other ways to another portion of the vehicle. The foot controls are often located near the foot rests to allow the operator to manipulate the foot controls without moving the operator's foot from the foot rest. Some users may prefer the use of foot controls for certain functions to reduce the number of hand controls in the vehicle. Foot controls also create a safer or more responsive system for braking, shifting, or accelerating.

SUMMARY

The present disclosure includes a mid-control system for a motor vehicle having a transmission and a primary cover opposite said transmission, said mid-control system including a first mid-control device connected to the transmission, said first mid-control device including a first footrest engaged with a first actuator pedal, said first actuator pedal connected to at least one fluid reservoir containing a fluid; and a second mid-control device connected to the primary cover, said second mid-control device comprising a pivot shaft, a second footrest engaged with a second actuator pedal and a cover plate, according to an embodiment of the present disclosure. In an aspect of such an embodiment, the first mid-control device includes an outer transmission cover and the fluid reservoir comprises a brake master cylinder. In an aspect of such an embodiment, the fluid reservoir is configured to hold brake fluid. In an aspect of such an embodiment, the first mid-control device further comprises a second fluid reservoir configured to hold hydraulic fluid. In an aspect of such an embodiment, the first fluid reservoir stores brake fluid and the second reservoir stores hydraulic fluid. In an aspect of such an embodiment activation of the first actuator pedal applies pressure through the piston assembly and the fluid, generating stopping power for the motor vehicle. In an aspect of such an embodiment, activation of the second actuator pedal manipulates the gears of the vehicle. In an aspect of such an embodiment, the cover plate comprises the fluid reservoir. In an aspect of such an embodiment, the first mid-control device includes an outer transmission cover with at least two connectors; wherein the first connector attaches to a brake line of the motor vehicle, and wherein the second connector attaches to a hydraulic clutch line of the motor vehicle transmission system. In an aspect of such an embodiment, the first mid-control device further comprises an outer transmission cover with at least two connectors; wherein the first connector attaches to a brake line of the motor vehicle, and wherein the second connector attaches to a clutch cable of the motor vehicle transmission system.

The present disclosure includes a mid-control device for a motor vehicle with a transmission, said mid-control device comprising a footrest, an actuator pedal, a pivot point, and a piston assembly connected to the actuator pedal, and a transmission cover connected to the footrest, wherein the transmission cover comprises at least one fluid reservoir wherein the actuator pedal is configured such that the application of force to the actuator pedal along a force vector rotates the actuator pedal about the pivot point, distributing force to the fluid reservoir through the piston assembly, according to an embodiment of the present disclosure. In an aspect of such an embodiment, the fluid reservoir comprises a brake master cylinder of a motor vehicle. In an aspect of such an embodiment, activation of the actuator pedal activates the brakes of a motor vehicle. In an aspect of such an embodiment, the mid-control device includes a motor vehicle transmission engaged with the transmission cover. In an aspect of such an embodiment, the transmission cover is one unitary piece. In an aspect of such an embodiment, the mid-control device includes a motor vehicle transmission wherein the transmission cover and the footrest attach to said motor vehicle transmission. In an aspect of such an embodiment, the mid-control device includes at least two connectors; wherein the first connector is configured to attach to a brake line of a motor vehicle, and wherein the second connector is configured to attach to a hydraulic clutch line for a motor vehicle. In an aspect of such an embodiment, the mid-control device includes at least two connectors; wherein the first connector is configured to attach to a brake line of a motor vehicle, and wherein the second connector is configured to attach to a clutch cable for a motor vehicle.

The present disclosure includes a mid-control device for a motor vehicle with a primary cover, said mid-control device comprising a footrest, a cover plate, and an actuator pedal connected to a pivot shaft; wherein the actuator pedal connects to the pivot shaft and wherein the application of force to the actuator pedal causes rotation of the actuator pedal about the pivot shaft. In an aspect of such an embodiment, the mid-control device is configured to engage with said motor vehicle primary cover. In an aspect of such an embodiment, the mid-control device includes a motor vehicle clutch cover engaged with the mid-control device. In an aspect of such an embodiment, the mid control device includes a support plate, comprised of one or more pieces, disposed between the motor vehicle primary cover and the motor vehicle clutch cover. In an aspect of such an embodiment, the application of force to the actuator pedal manipulates the gears of the vehicle. In an aspect of such an embodiment, the application of force to the actuator pedal activates the clutch of the vehicle.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DETAILED DESCRIPTION

Figure 1:
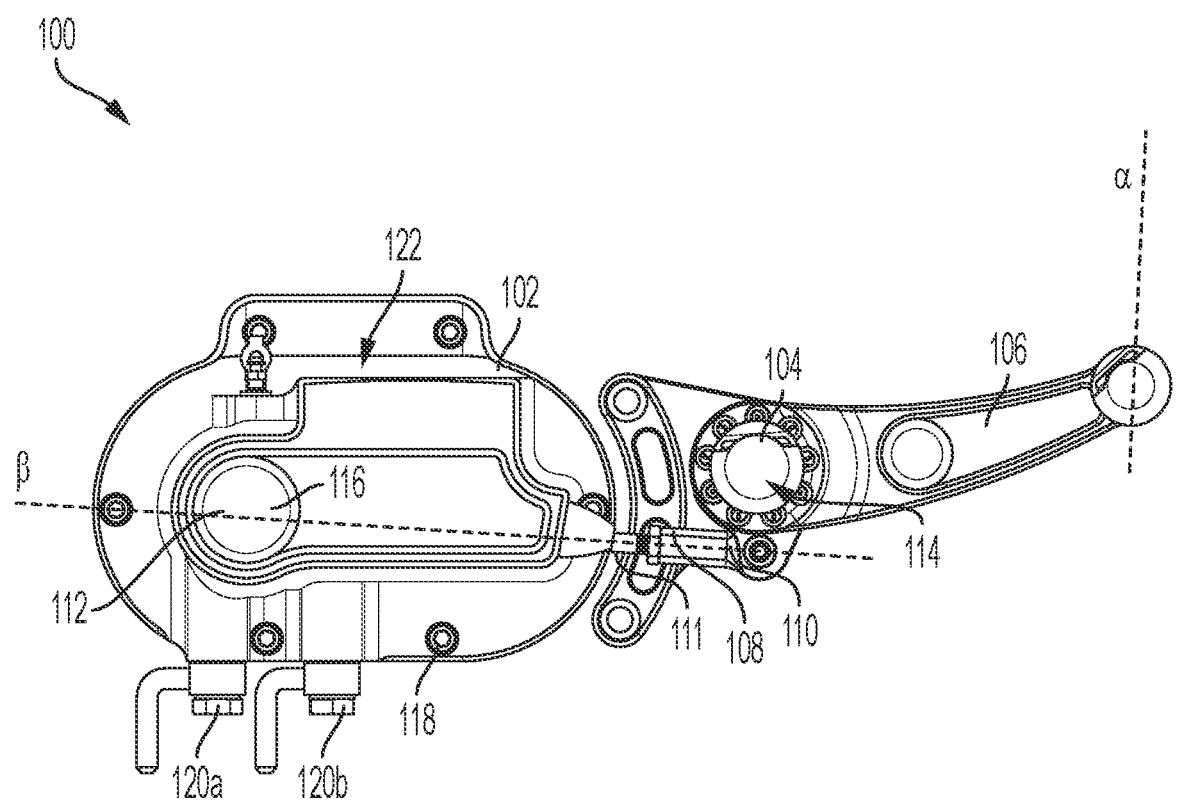
FIG. 1 shows a side view of a right-side mid-control device according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
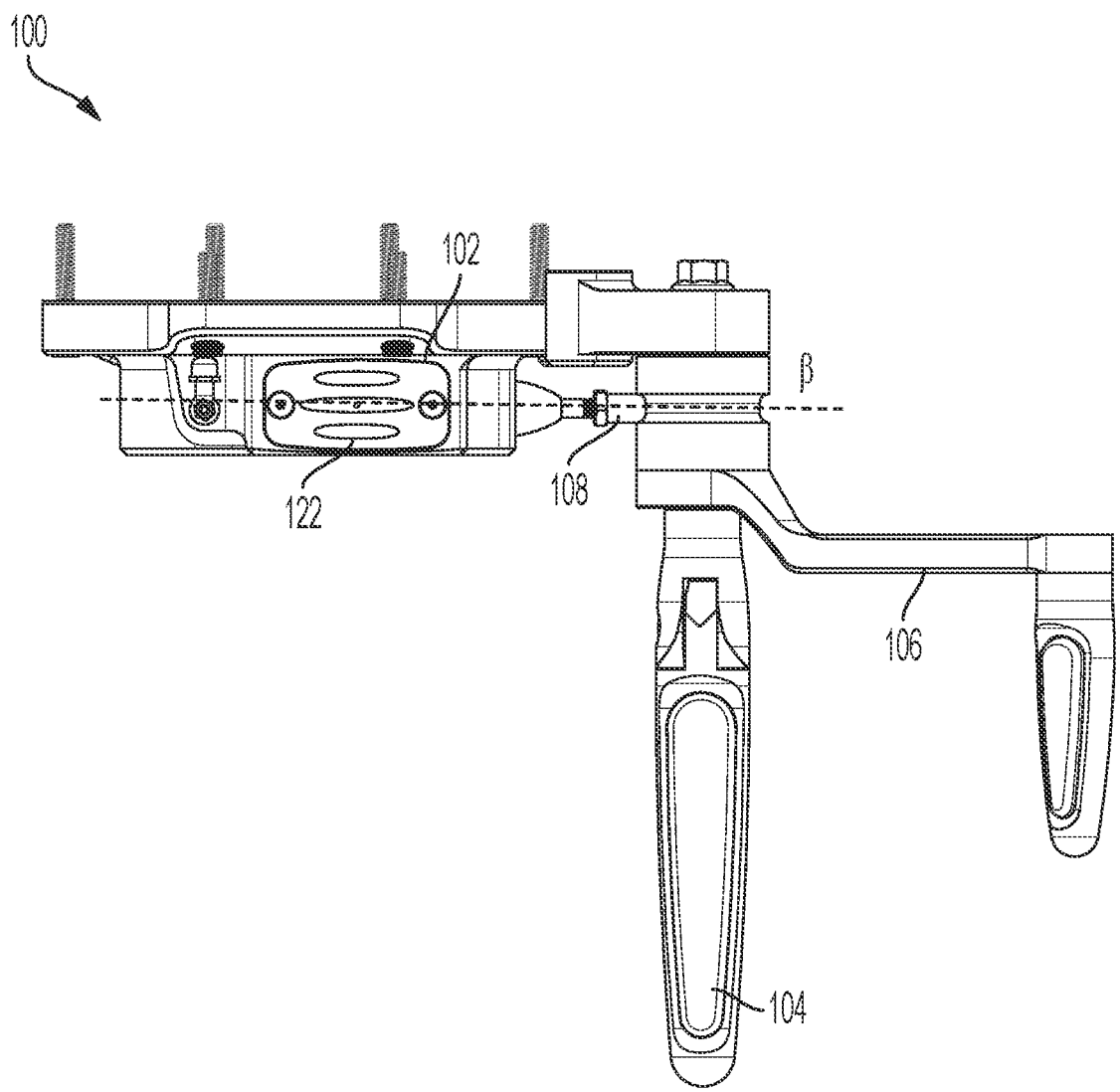
FIG. 2 shows a top view of a right-side mid-control device according to at least one embodiment of the present disclosure.
Figure 3:
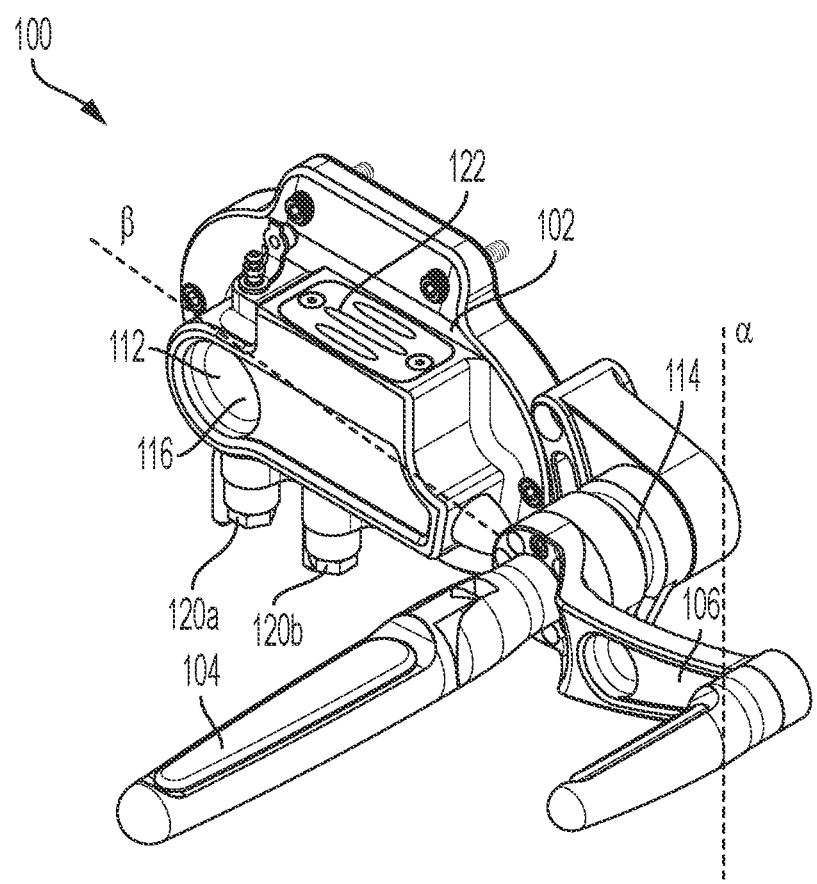
FIG. 3 shows an upper perspective view of a right-side mid-control device according to at least one embodiment of the present disclosure.
Figure 4:
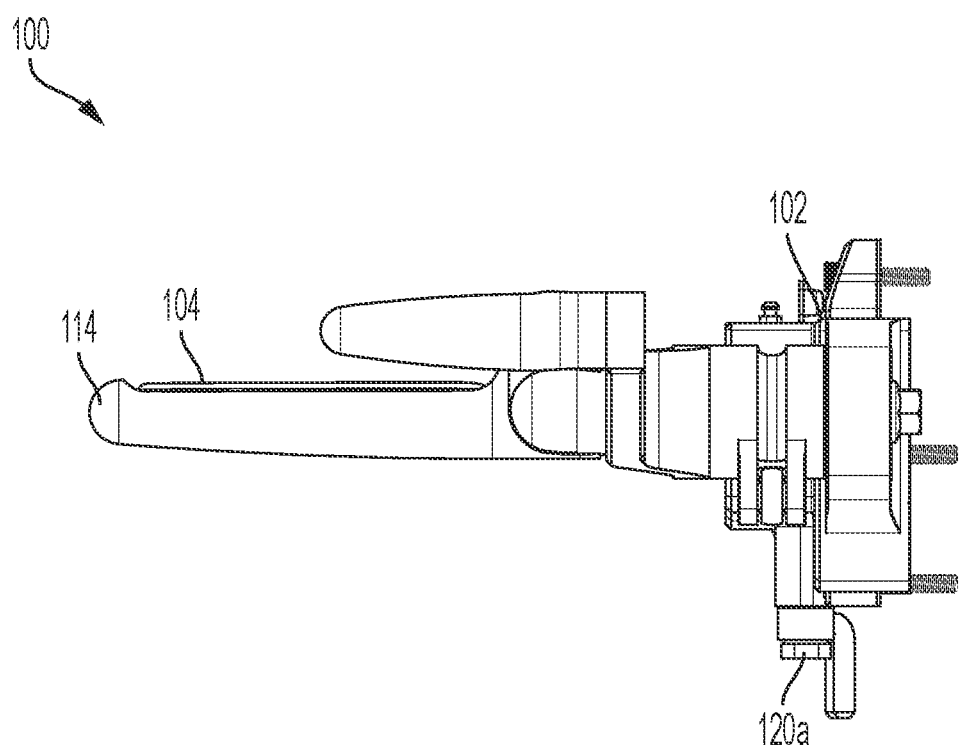
FIG. 4 shows a front view of a right-side mid-control device according to at least one embodiment of the present disclosure.
Figure 5:
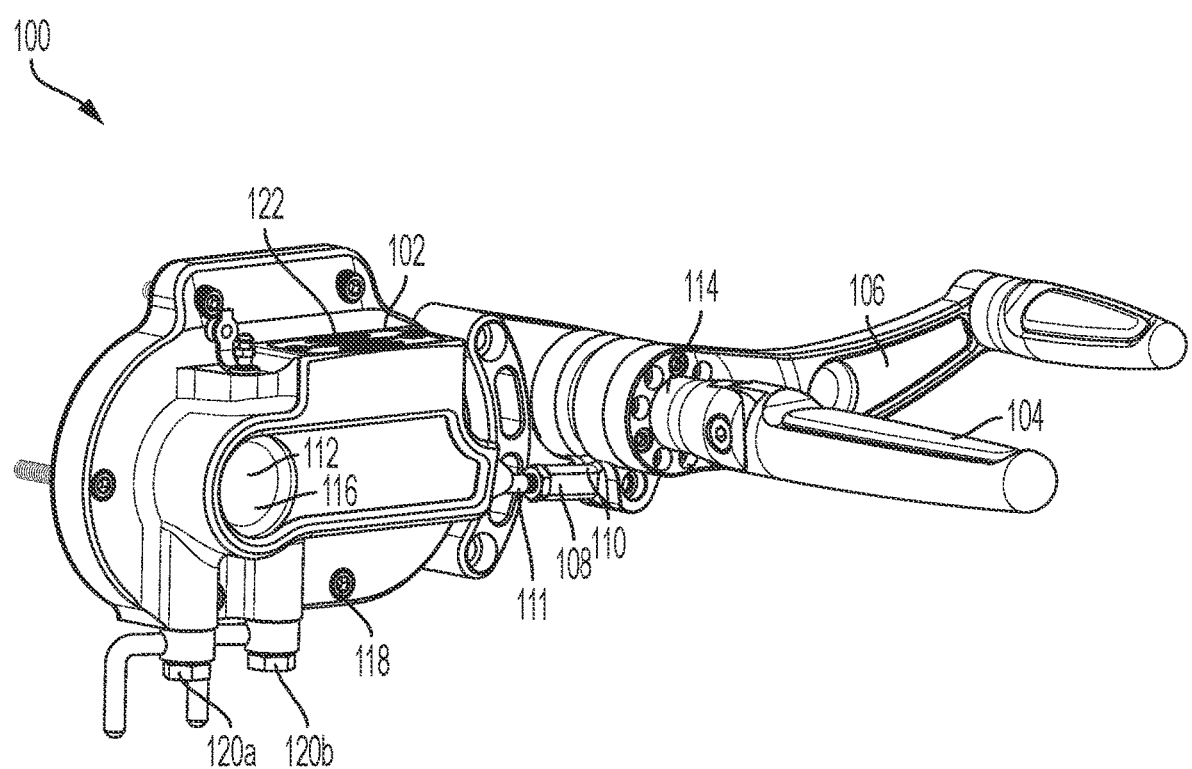
FIG. 5 shows a side perspective view of a right-side mid-control device according to at least one embodiment of the present disclosure.
Figure 6:
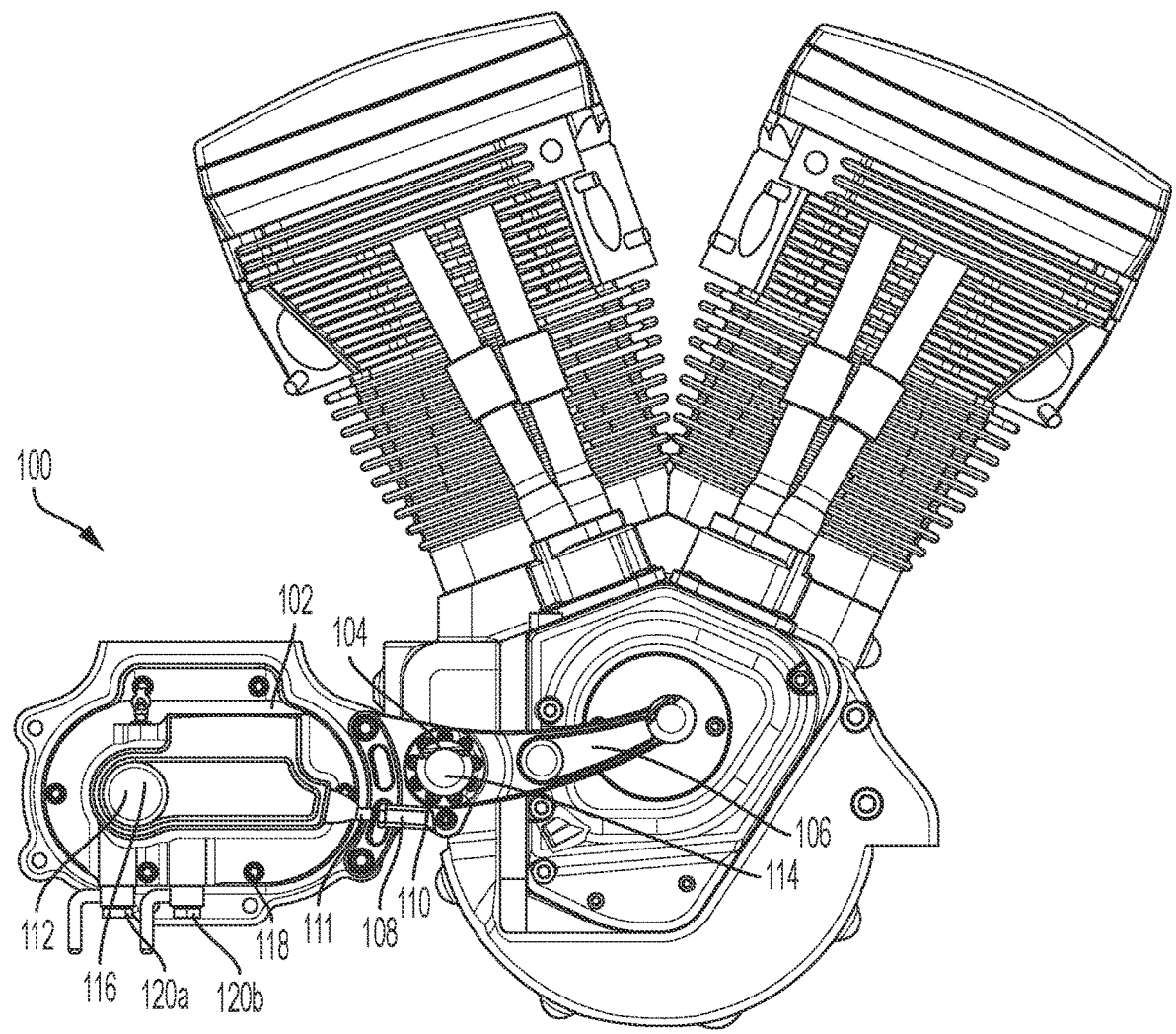
FIG. 6 shows a side view of a right-side mid-control device engaged with a motor vehicle engine and transmission, according to at least one embodiment of the present disclosure.
Figure 7:
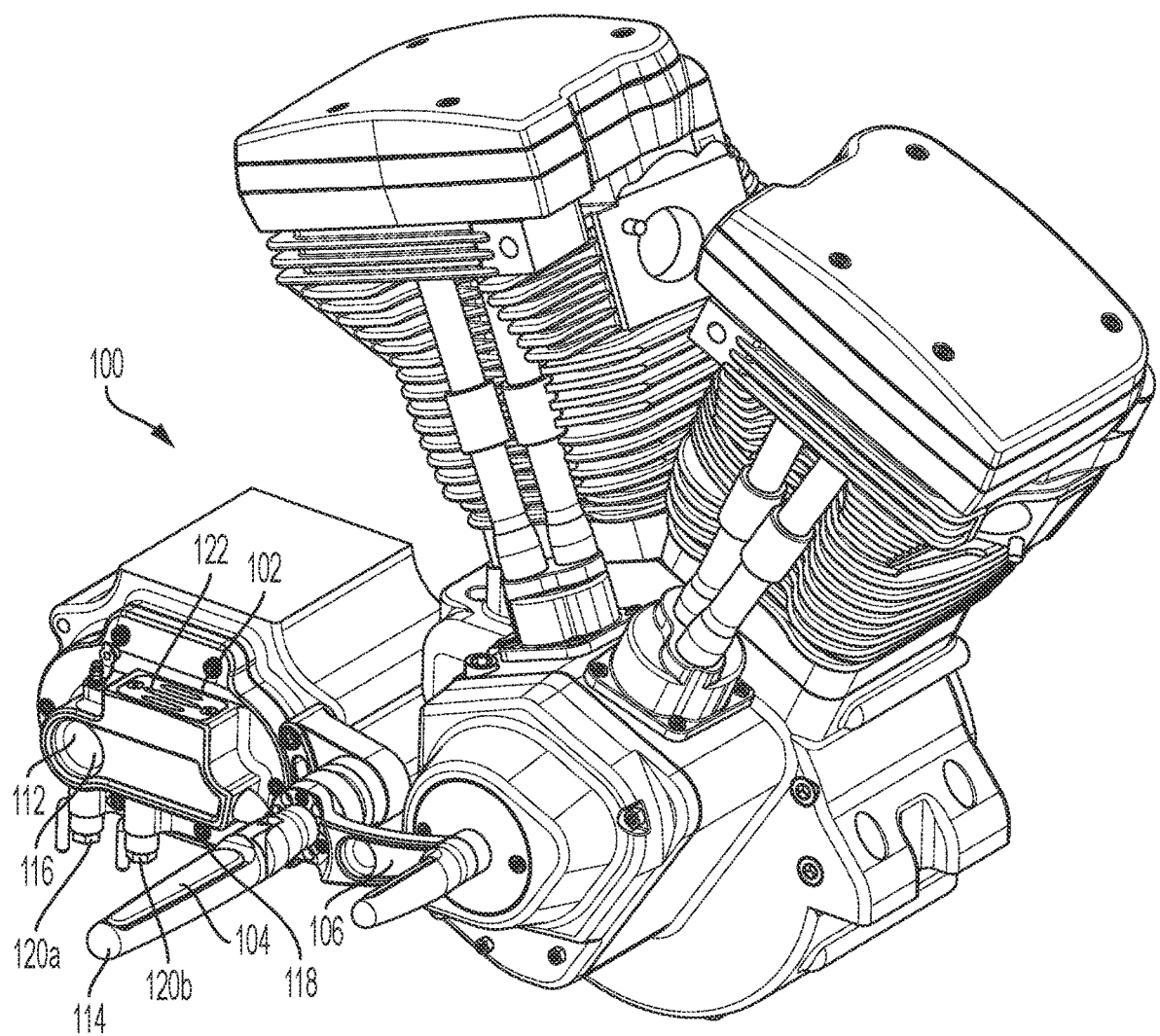
FIG. 7 shows a side perspective view of a right-side mid-control device engaged with a motor vehicle engine and transmission, according to at least one embodiment of the present disclosure.

FIGS. 1-7 show various views of a right-side mid-control device 100 according to an embodiment of the present disclosure. FIG. 1 shows a side view of a right-side mid-control device 100 according to at least one embodiment of the present disclosure. FIG. 2 shows a top view of a right-side mid-control device 100 according to at least one embodiment of the present disclosure. FIG. 3 shows an upper perspective view of a right-side mid-control device 100 according to at least one embodiment of the present disclosure. FIG. 4 shows a front view of a right-side mid-control device 100 according to at least one embodiment of the present disclosure. FIG. 5 shows a side perspective view of a right-side mid-control device 100 according to at least one embodiment of the present disclosure. FIG. 6 shows a side perspective view of a right-side mid-control device 100 engaged with a motor vehicle engine and transmission, according to at least one embodiment of the present disclosure. FIG. 7 shows a side perspective view of a right-side mid-control device 100 engaged with a motor vehicle engine and transmission, according to at least one embodiment of the present disclosure.

According to an embodiment, the right-side mid-control device 100 includes a housing 102 connected to a right footrest 104. According to an embodiment, the right footrest 104 includes an actuator pedal 106 extending away from the right footrest 104. According to an embodiment, the right-side mid-control device 100 includes a piston assembly 108 with a piston first end 110 and a piston second end 111. According to an embodiment, the right-side mid-control device 100 includes at least a first fluid reservoir 122. According to an embodiment, the right-side mid-control device 100 includes a second fluid reservoir 112. According to an embodiment, the first fluid reservoir 122 includes a brake master cylinder assembly. According to an embodiment the first fluid reservoir 122 contains brake fluid. According to an embodiment, the second reservoir 112 contains hydraulic fluid. According to an embodiment, the right-side mid-control device 100 includes a first fluid reservoir 122 containing brake fluid and a second fluid reservoir 112 containing hydraulic fluid.

According to an embodiment, the right-side mid-control device 100 includes a pivot point 114. In some aspects, the pivot point 114 is the right foot rest 104. In other embodiments, the pivot point 114 is in proximity to the right foot rest 104. According to an embodiment the housing 102 includes a viewing window 116. In some embodiments, the viewing window 116 allows a user to view the fluid level within the second fluid reservoir 112. According to an embodiment, applying pressure along pressure vector α results in a braking force β. According to an embodiment, vector α is curved about the pivot point. The braking force β activates the piston assembly 108. Activation of the piston assembly 108 generates stopping power by building fluid pressure in the first fluid reservoir 122 which fluid pressure is delivered through the brake lines (not shown) to the brakes (not shown) of the motor vehicle. According to an embodiment, the right-side mid-control device 100 includes a plurality of apertures 118. These apertures 118 align with connection points (not shown) on the motor vehicle transmission, allowing for the right-side mid-control device 100 to attach to the motor vehicle (not shown) which attachment occurs, in some embodiments, via the motor vehicle transmission (not shown). According to an embodiment, these apertures 118 are fitted for bolts, screws, pins, or other suitable fasteners.

According to an embodiment, the incorporation of the second fluid reservoir 112 into the housing 102 of the right-side mid-control device 100 results in a compact design, reduces weight, provides added protection for operational components, and allows for increased clearance above the ground when an operator leans the motor vehicle.

According to an embodiment, the right-side mid-control device 100 includes a connector 120a configured to connect to a brake line (not shown). According to an embodiment, said connector 120a is a banjo bolt. According to an embodiment, the right-side mid-control device 100 includes a connector 120b configured to connect to a hydraulic clutch line (not shown). According to an embodiment, said connector 120b is a banjo bolt. According to an embodiment, the right-side mid-control device 100 includes at least two connectors 120a/120b configured separately to connect to brake lines and clutch lines. According to an embodiment, the right-side mid-control device 100 includes a connector 120a configured to connect to a clutch cable (not shown). According to an embodiment, the connector 120b attaches to a brake line (not shown), while connector 120a attaches to a hydraulic clutch line (not shown). According to an embodiment one connector 120b attaches to a hydraulic brake line and the connector 120a attaches to the clutch cable (not shown) of the motor vehicle.

Figure 8:
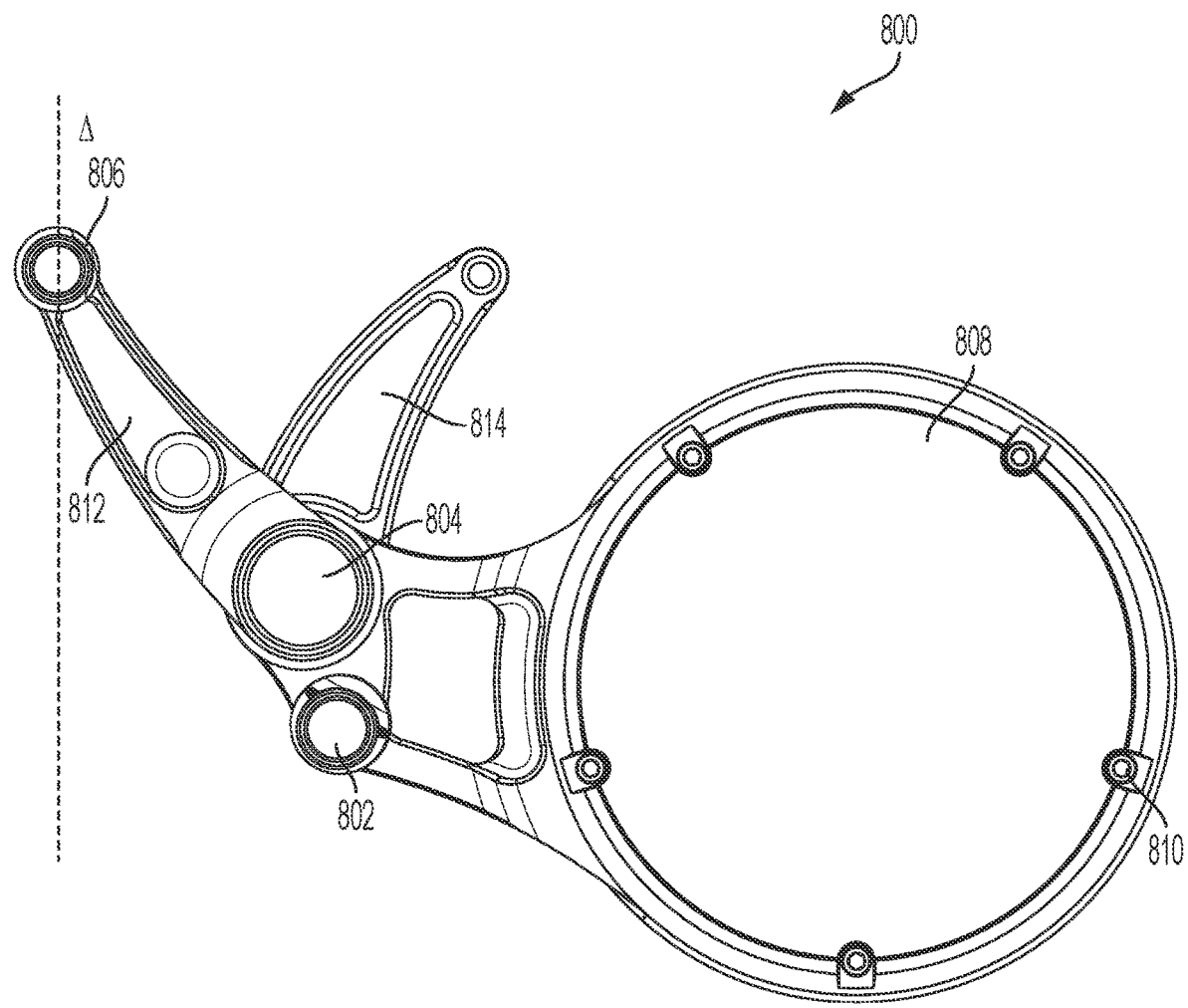
FIG. 8 shows a side view of a left-side mid-control device according to at least one embodiment of the present disclosure.
Figure 9:
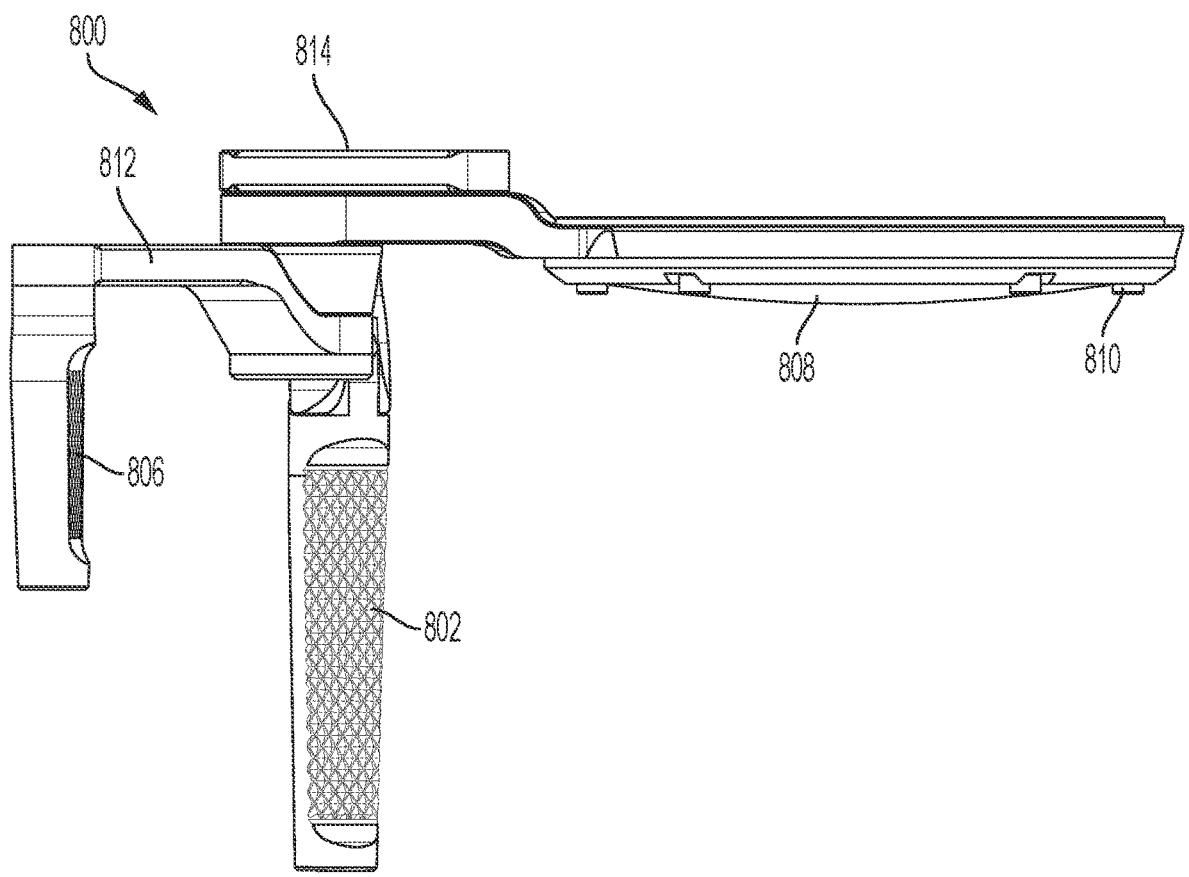
FIG. 9 shows a top view of a left-side mid-control device according to at least one embodiment of the present disclosure.
Figure 10:
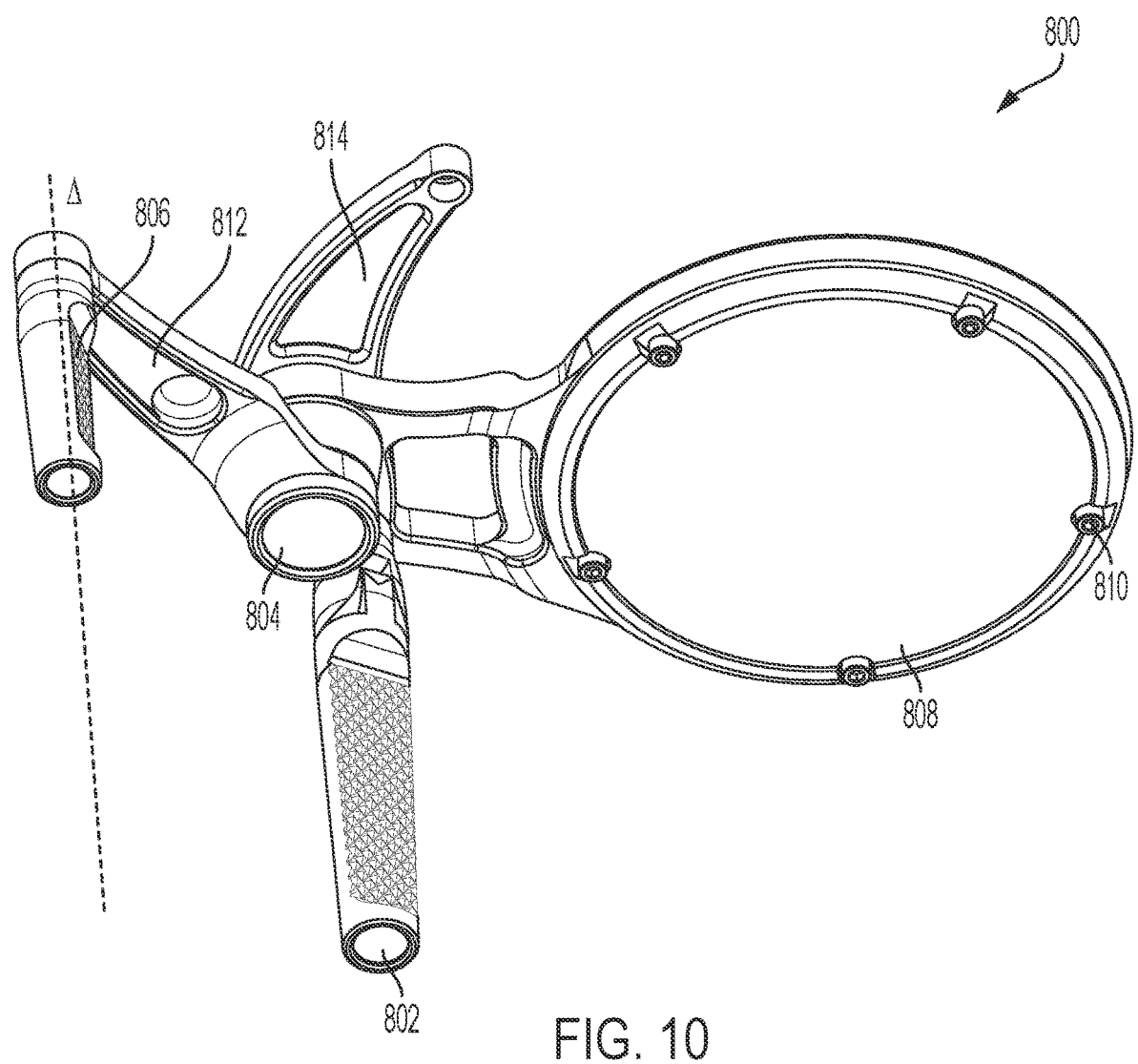
FIG. 10 shows an upper perspective view of a left-side mid-control device according to at least one embodiment of the present disclosure.
Figure 11:
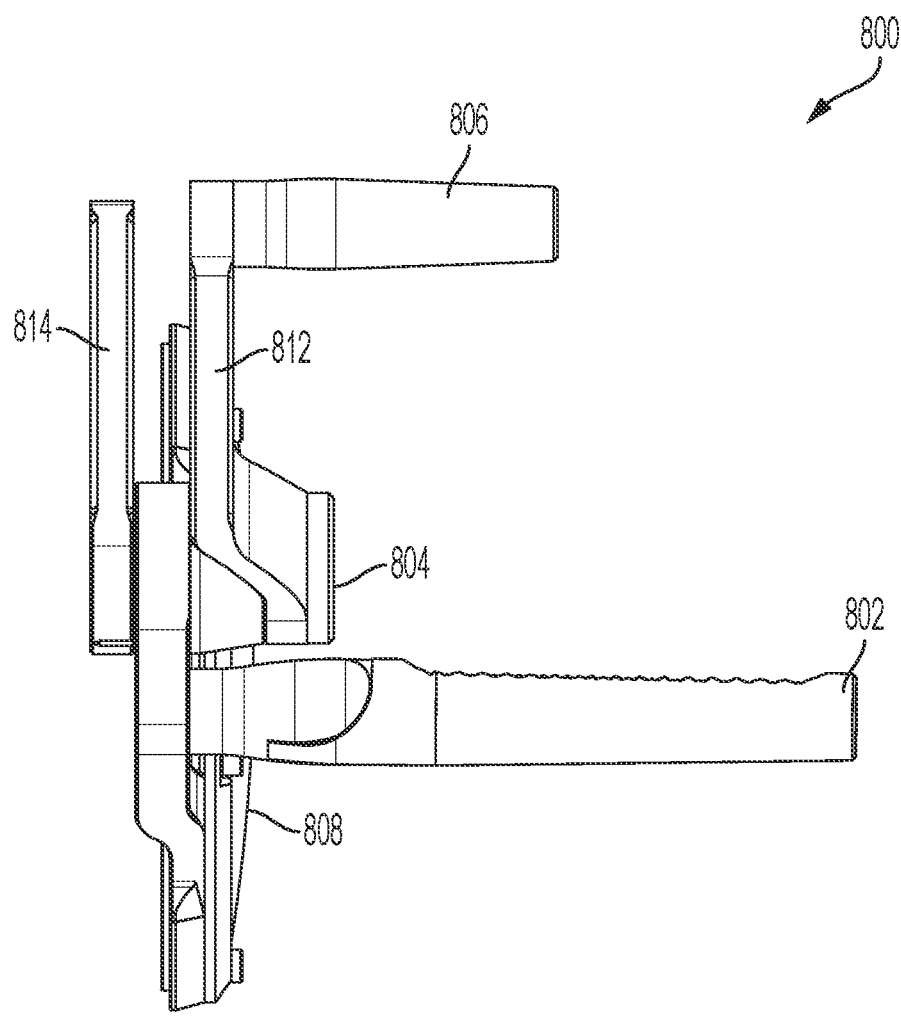
FIG. 11 shows a front view of a left-side mid-control device according to at least one embodiment of the present disclosure.
Figure 12:
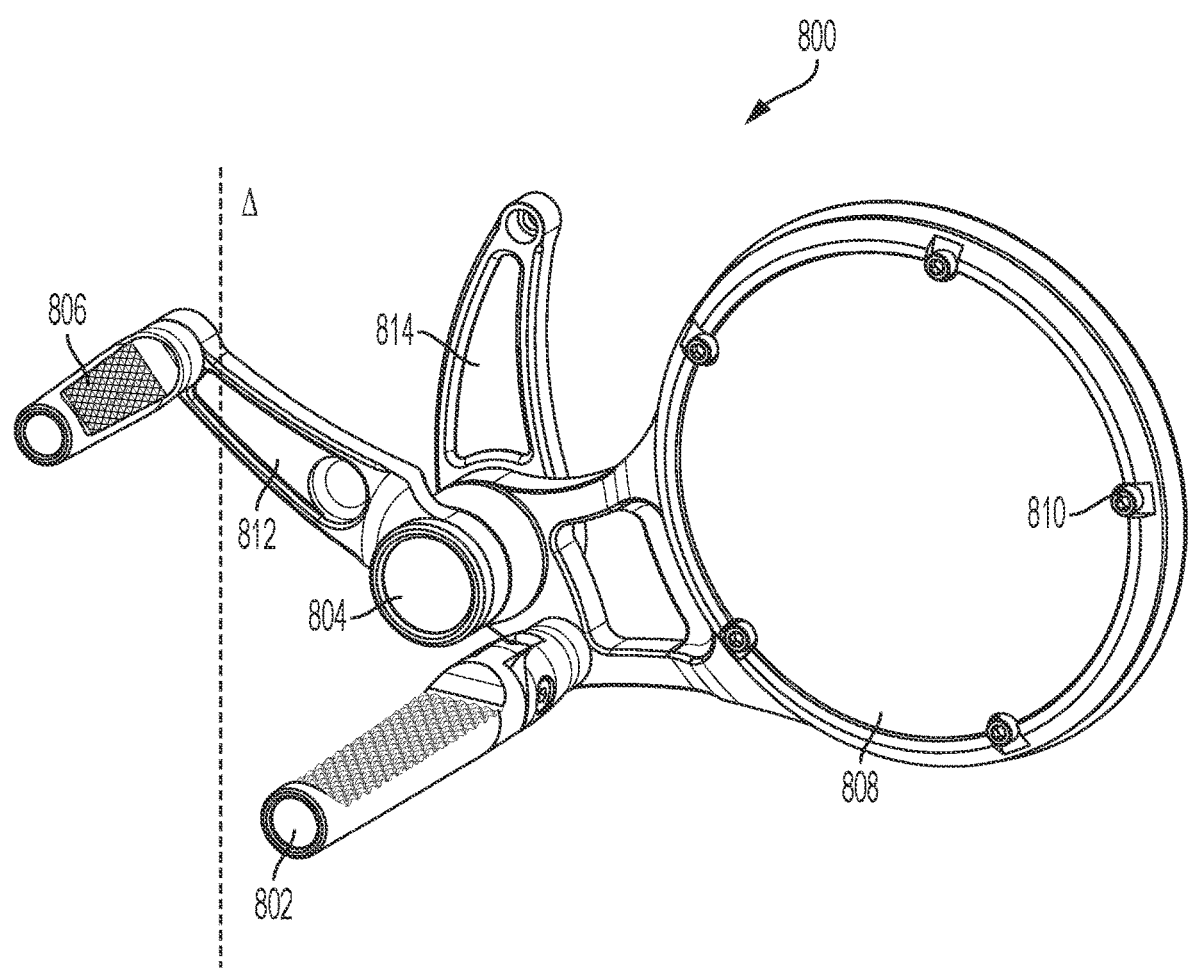
FIG. 12 shows a side perspective view of a left-side mid-control device according to at least one embodiment of the present disclosure.
Figure 13:
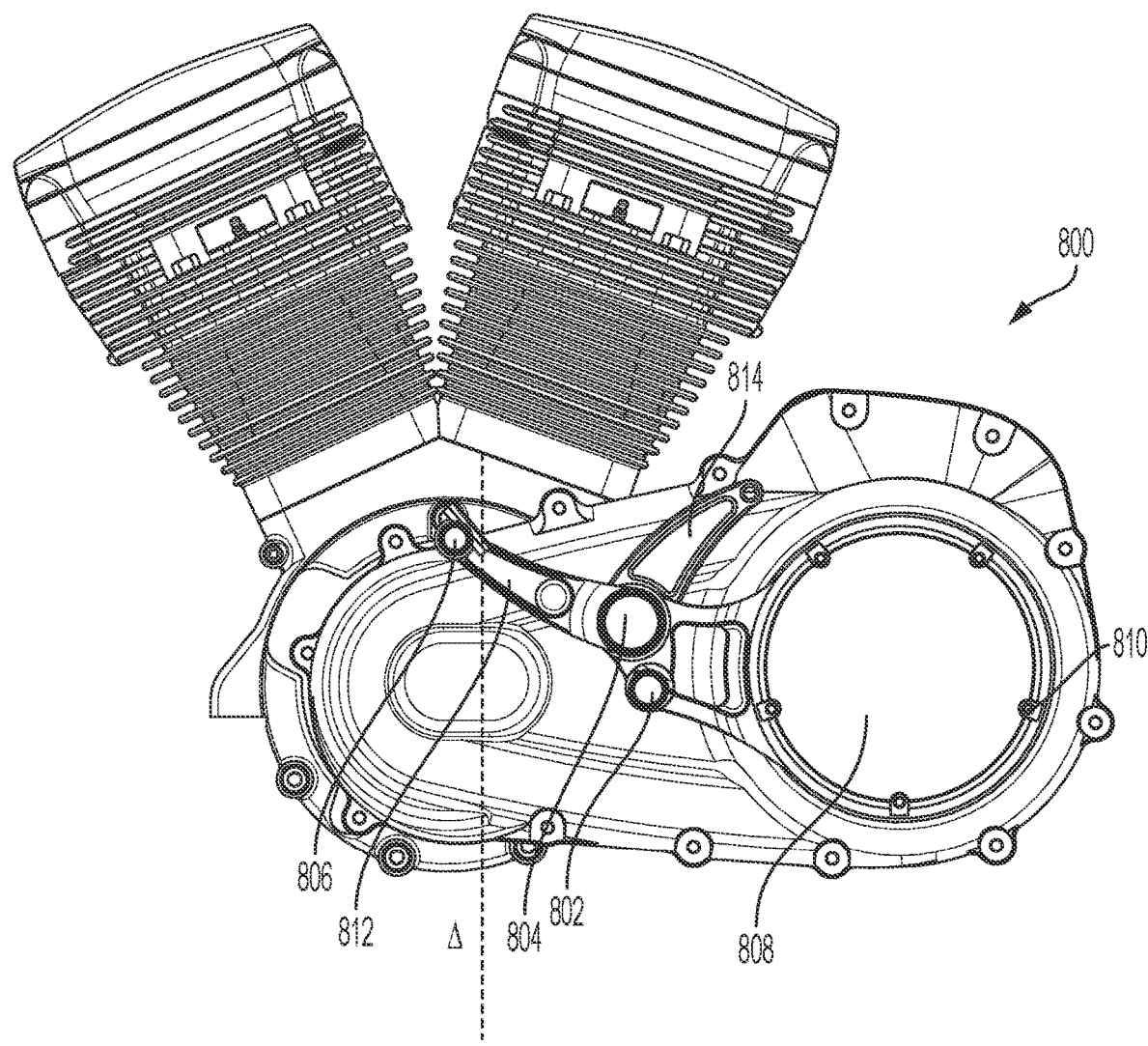
FIG. 13 shows a side view of a left-side mid-control device engaged with a motor vehicle engine and primary cover, according to at least one embodiment of the present disclosure.
Figure 14:
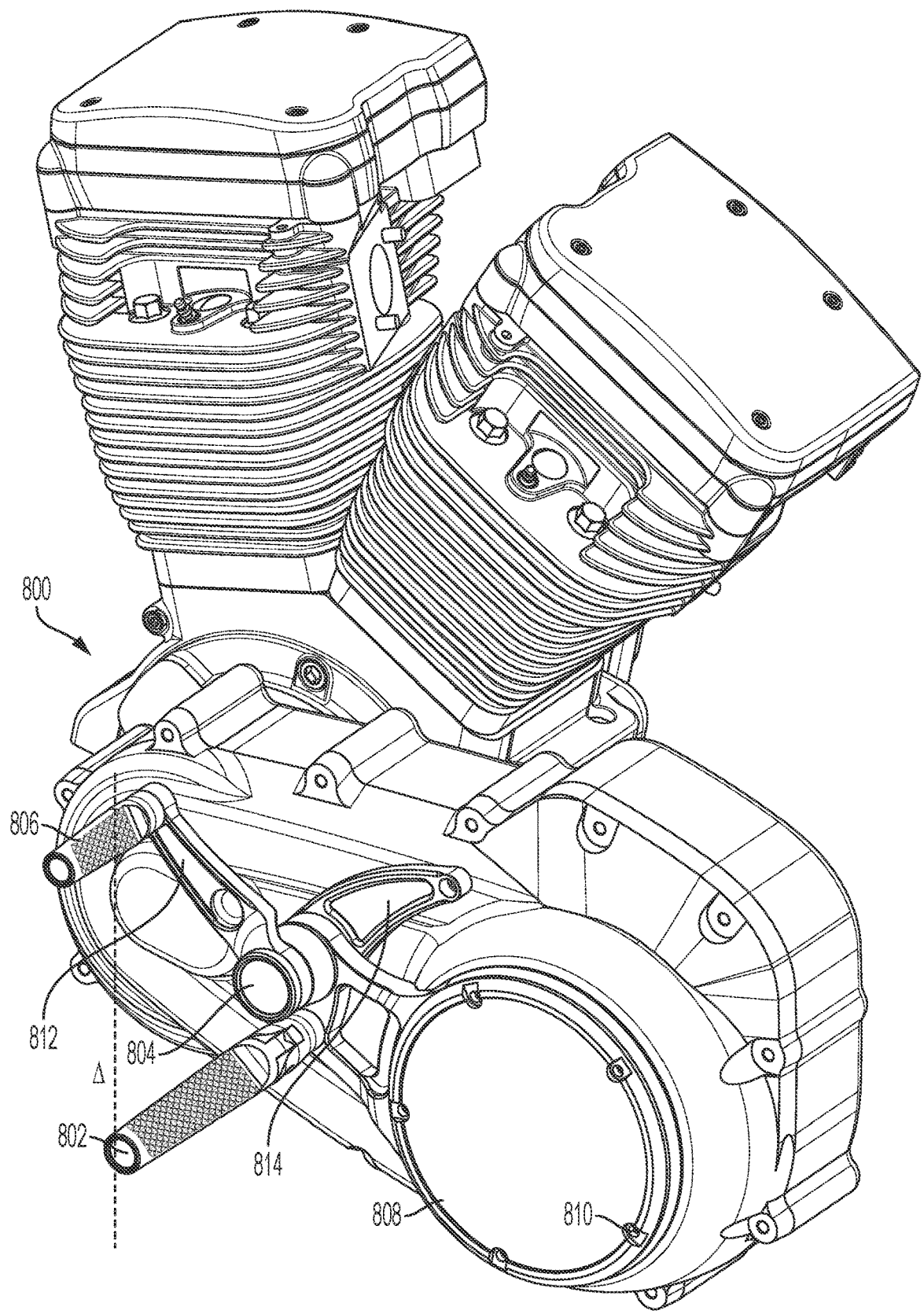
FIG. 14 shows a side perspective view of a left-side mid-control device engaged with a motor vehicle engine and primary cover, according to at least one embodiment of the present disclosure.

FIGS. 8-14 show various views of a left-side mid-control device 800 according to an embodiment of the present disclosure. FIG. 8 shows a side view of a left-side mid-control device 800 according to at least one embodiment of the present disclosure. FIG. 9 shows a top view of a left-side mid-control device 800 according to at least one embodiment of the present disclosure. FIG. 10 shows an upper perspective view of a left-side mid-control device 800 according to at least one embodiment of the present disclosure. FIG. 11 shows a front view of a left-side mid-control device 800 according to at least one embodiment of the present disclosure. FIG. 12 shows a side perspective view of a left-side mid-control device 800 according to at least one embodiment of the present disclosure. FIG. 13 shows a side perspective view of a left-side mid-control device 800 engaged with a motor vehicle primary cover, according to at least one embodiment of the present disclosure. FIG. 14 shows a side perspective view of a left-side mid-control device 800 engaged with a motor vehicle primary cover, according to at least one embodiment of the present disclosure.

According to an embodiment, the left-side mid-control device 800 includes a left footrest 802. According to an embodiment, the left-side mid-control device 800 has a left pivot shaft 804. According to an embodiment, the left-side mid-control device 800 has a left actuator pedal 806. According to an embodiment, the left-side mid-control device 800 has a cover plate 808. According to an embodiment, an operator applies force along force vector A to the left actuator pedal 806, causing rotation of the left actuator pedal 806 about the left pivot shaft 804 to activate the left actuator pedal 806. According to an embodiment, vector A is curved about the pivot point. According to an embodiment, the left actuator pedal 806 is a gear shifting pedal. In another embodiment, the left actuator pedal 806 controls the clutch. According to an embodiment, the left-side mid-control device 800 includes a plurality of apertures 810. According to an embodiment, the apertures 810 are configured to attach the left-side mid-control device 800 to a motor vehicle primary cover. According to an embodiment the left-side mid-control device 800 includes a first lever 812 connecting the left pivot shaft 804 to the left actuator pedal 806. According to an embodiment, the left-side mid-control device 800 includes a second lever 814 connecting the left pivot shaft 804 to the transmission of the motor vehicle (not shown). According to an embodiment, the left-side mid-control device 800 includes a second lever 814 connected to the left pivot shaft 804, which, in turn, is connected to the second lever extension 2004 and the shift linkage 2002, which connects to the transmission of the motor vehicle (not shown).

According to an embodiment, the left footrest 802 is positioned below the left pivot shaft 804, closer to the bottom of the motor vehicle. In other embodiments, the left footrest 802 is positioned above the left pivot shaft 804, closer to the top of the motor vehicle. In still another embodiment, the left footrest 802 is aligned with the left pivot shaft 804. According to an embodiment, the cover plate 808 extends toward the pivot shaft 804 and contains an aperture to connect to the pivot shaft 804. According to an embodiment, the left actuator pedal 806 attaches to the first lever 812.

Figure 15:
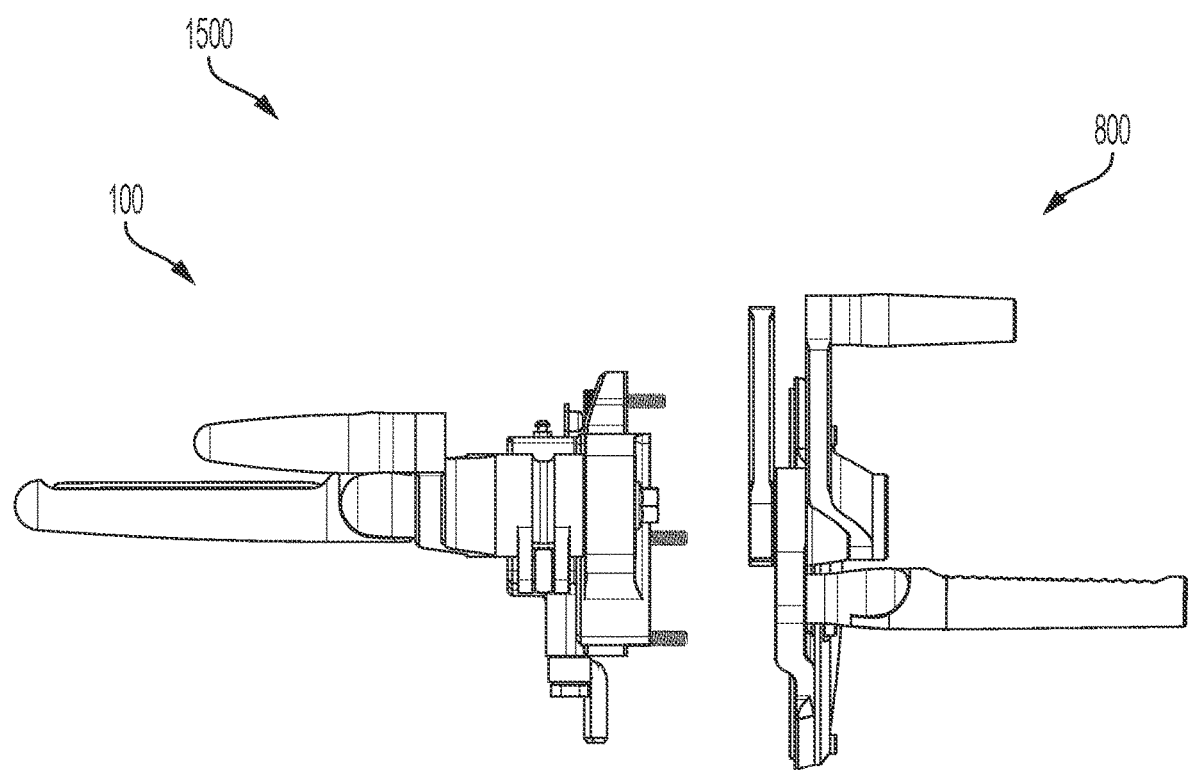
FIG. 15 shows a front view of a mid-control system according to at least one embodiment of the present disclosure.
Figure 16:
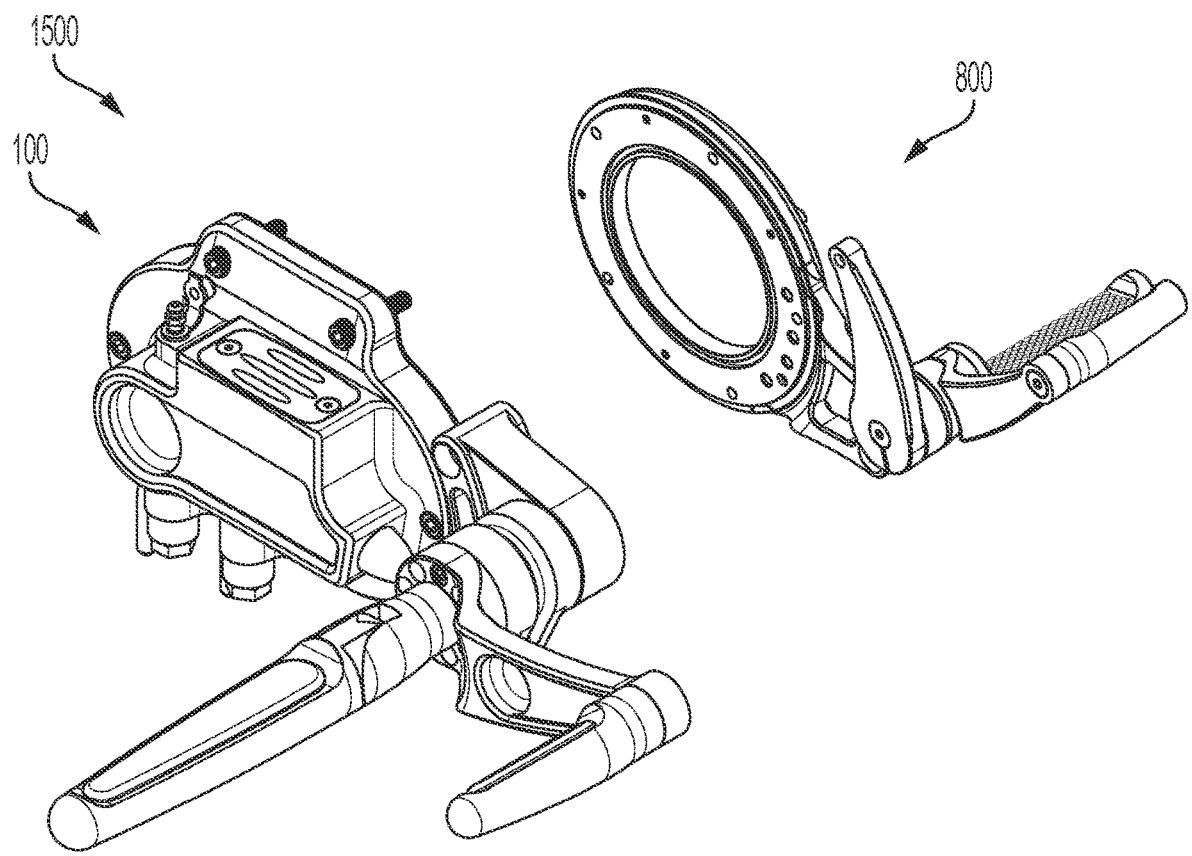
FIG. 16 shows a top perspective view of a mid-control system according to at least one embodiment of the present disclosure.

FIGS. 15 and 16 show various orientations of mid-control system 1500. FIG. 15 shows a front view of a mid-control system 1500 according to at least one embodiment of the present disclosure. FIG. 16 shows a top perspective view of a mid-control system 1500 according to at least one embodiment of the present disclosure. According to an embodiment of the present disclosure, the mid-control system 1500 includes a right-side mid-control device 100 and a left-side mid-control device 800.

Figure 17:
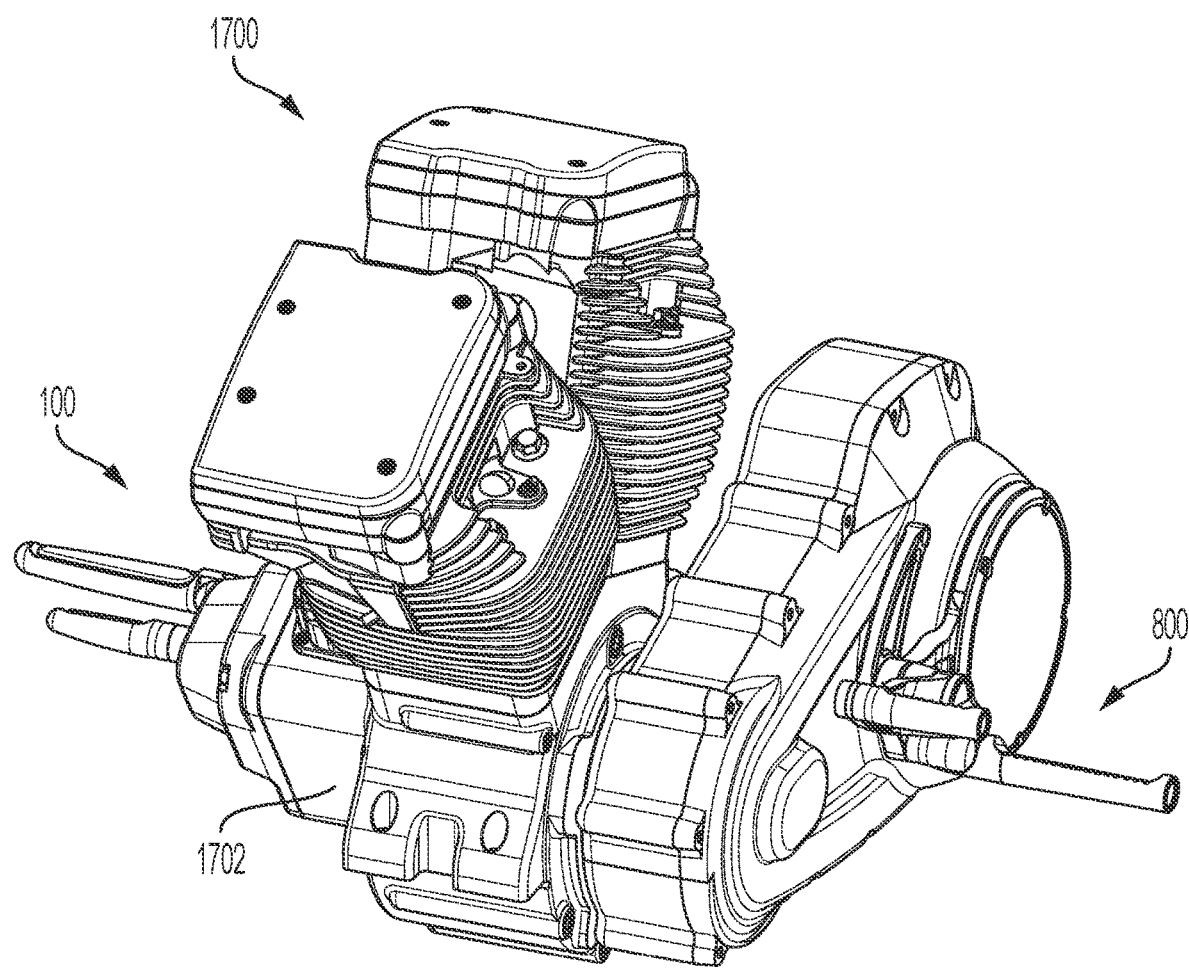
FIG. 17 shows a front environmental view of a motor vehicle engine, transmission system, and primary cover with a mid-control system according to at least one embodiment of the present disclosure.
Figure 18:
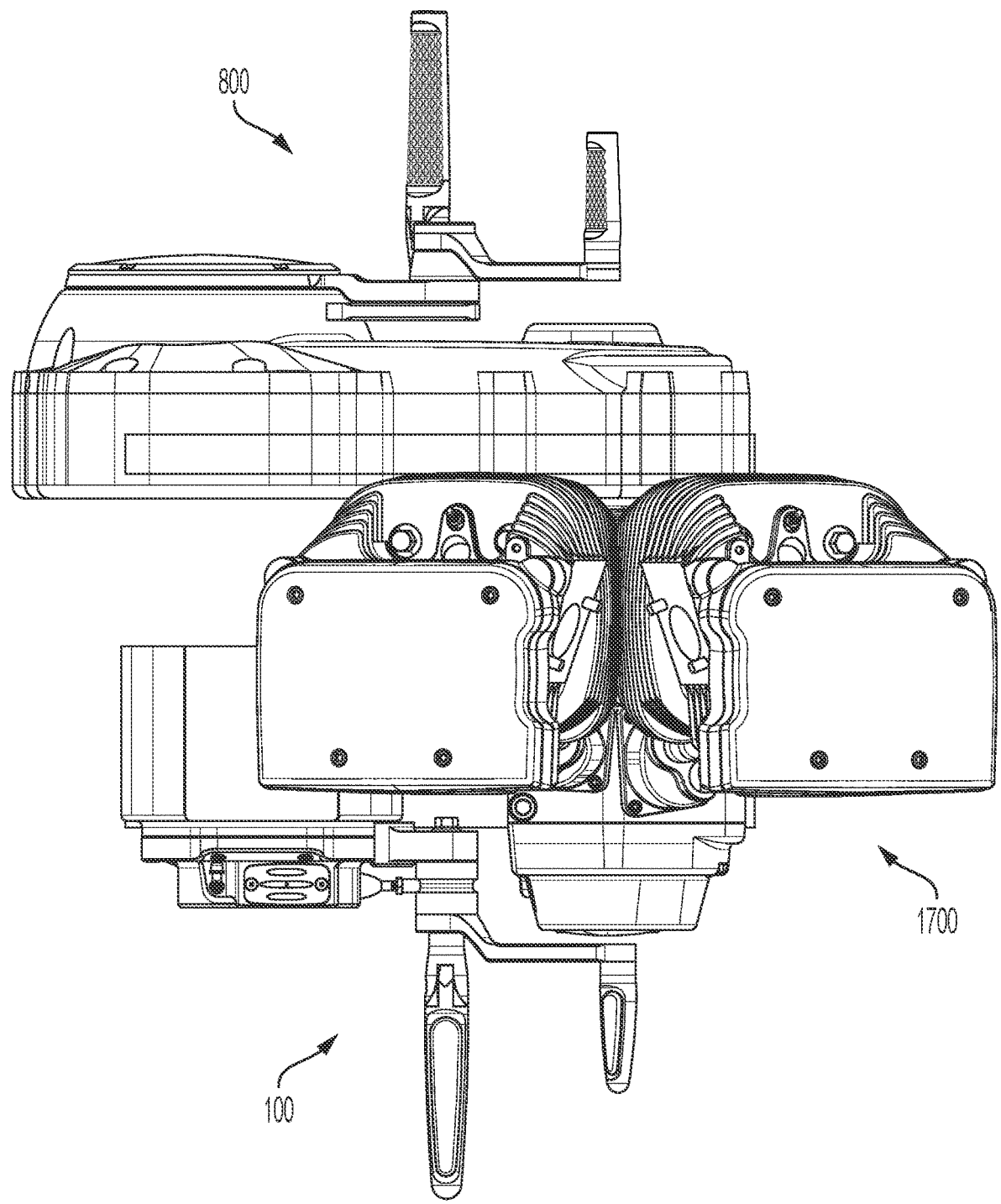
FIG. 18 shows a top environmental view of a motor vehicle engine, transmission system, and primary cover with a mid-control system according to at least one embodiment of the present disclosure.

FIGS. 17 and 18 show environmental views of a motor vehicle engine 1700 with a mid-control system 1500. FIG. 17 shows a front environmental view of a motor vehicle engine 1700 with a mid-control system 1500 according to at least one embodiment of the present disclosure. FIG. 18 shows a top environmental view of a motor vehicle engine 1700 with a mid-control system 1500 according to at least one embodiment of the present disclosure.

FIGS. 17 and 18 illustrate the attachment of the right-side mid-control device 100 and a left-side mid-control device 800 to a motor vehicle engine 1700. According to an embodiment, the right-side mid-control device 100 is configured to attach to the transmission 1702 of the motor vehicle engine 1700. In an embodiment, the right-side mid-control device 100 replaces the original-equipment transmission cover of the motor vehicle engine 1700. In an embodiment, the right-side mid-control device 100 comprises a cover for a portion of the transmission of the motor vehicle engine 1700. In another embodiment, the right-side mid-control device 100 comprises a transmission cover for the motor vehicle engine 1700. According to an embodiment, the left-side mid-control device 800 is configured to attach to the primary cover of the motor vehicle engine 1700. In an embodiment, the left-side mid-control device 800 comprises a clutch cover for the motor vehicle engine 1700. It will be understood by one of skill in the art that the clutch cover may be referred to as a derby cover, which both are sometimes referred to herein as a cover plate. According to an embodiment, the left-side mid-control device 800 is configured to attach to the primary cover of the motor vehicle engine 1700. According to an embodiment, the outer surface of the left-side mid-control device 800 is configured to display a logo, artwork, or indicia. According to an embodiment, the cover plate 808 of the left-side mid-control device 800 is transparent. According to an embodiment, the left-side mid-control device 800 is constructed as multiple pieces, comprising a support portion 2000 which engages the primary cover and a cover plate. According to an embodiment, the left-side mid-control device 800 is constructed as a one-piece support plate with a separate derby cover. According to an embodiment, the left-side mid-control device 800 is a one-piece integrated support plate and derby cover.

Figure 19:
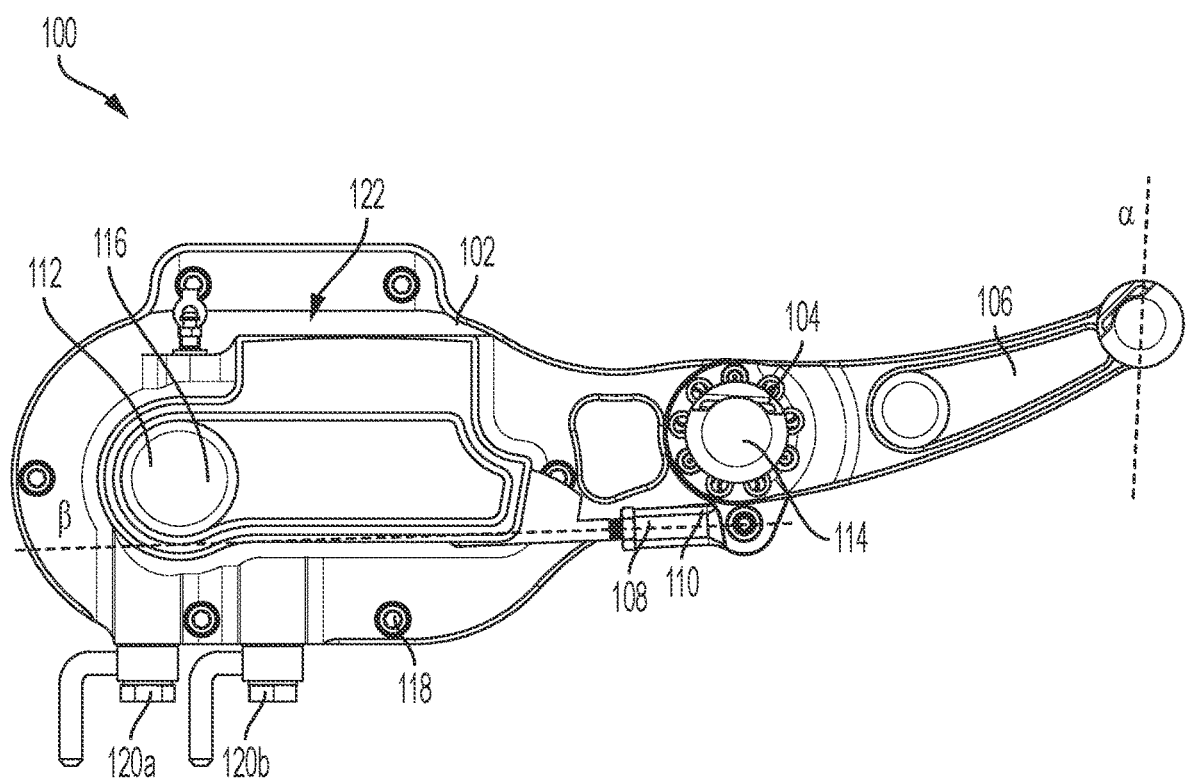
FIG. 19 shows a side view of a right-side a mid-control device according to at least one embodiment of the present disclosure.

FIG. 19 illustrates a right-side mid-control device 100 according to an embodiment of the present disclosure. According to such an embodiment, the right-side mid control device 100 is constructed as one unitary piece.

Figure 20:
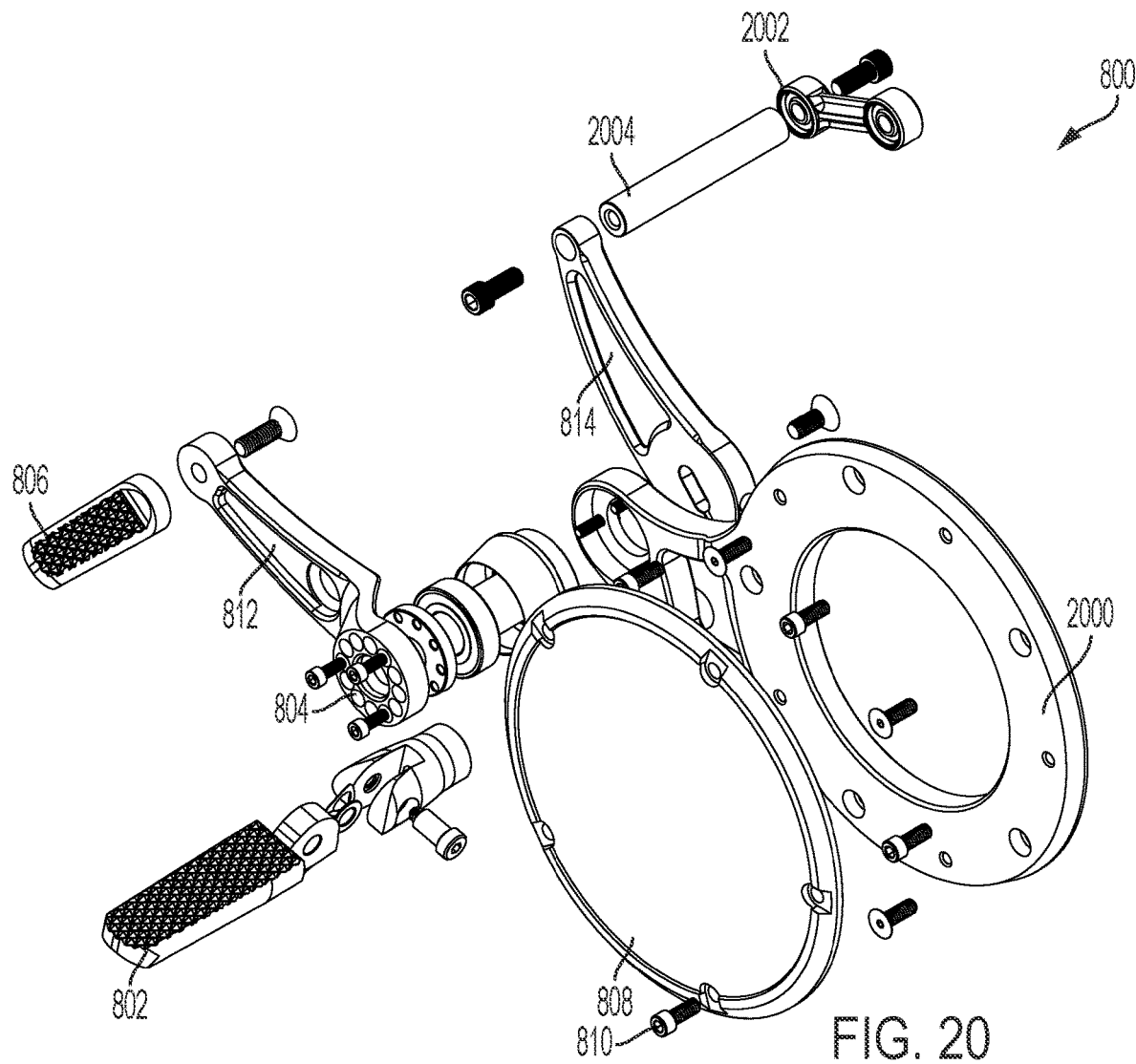
FIG. 20 shows an exploded side view of a left-side mid-control device according to at least one embodiment of the present disclosure.
Figure 21:
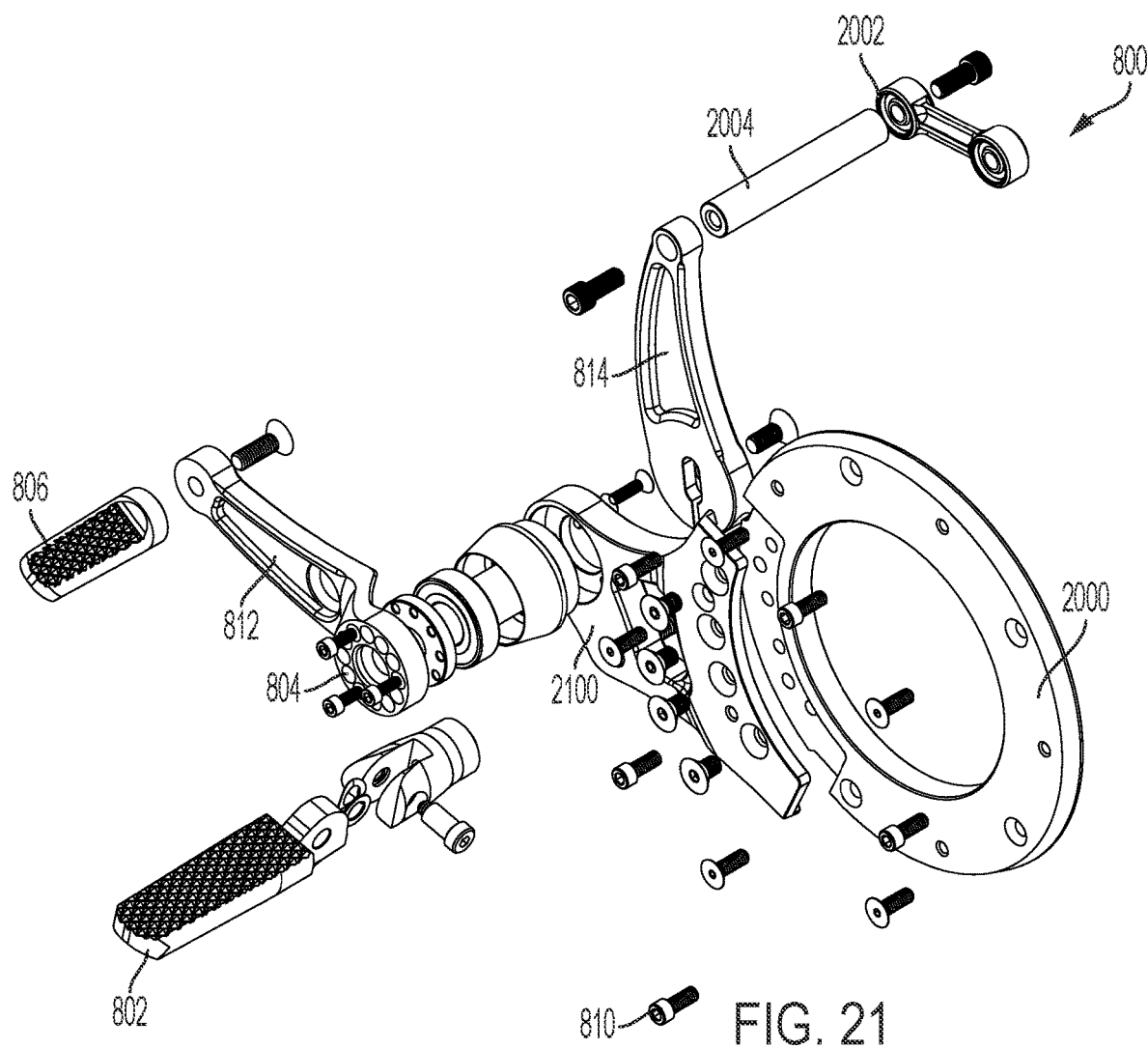
FIG. 21 shows an exploded side view of a left-side mid-control device according to at least one embodiment of the present disclosure.
Figure 22:
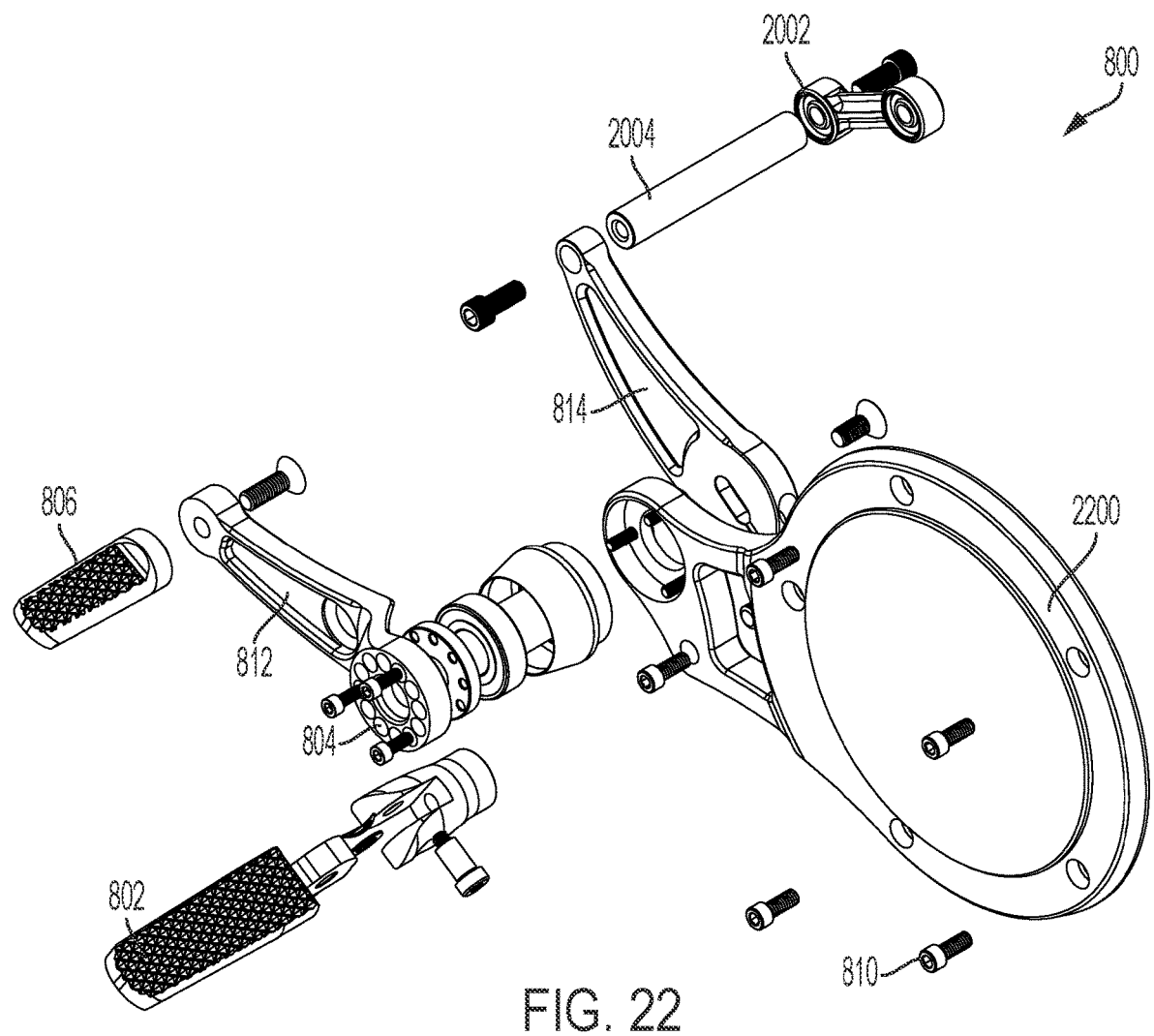
FIG. 22 shows an exploded side view of a left-side mid-control device according to at least one embodiment of the present disclosure.

FIGS. 20-22 show exploded views of a left-side mid-control device 800 according to various embodiments of the present disclosure. According to one such embodiment, the pivot shaft 804 and the left actuator pedal 806 are separate from the cover plate 808. In such an embodiment, the cover plate 808 and the left actuator pedal 806 attach to the motor vehicle separately. FIG. 20 shows the left-side mid-control device 800 includes a support portion 2000 and a cover plate 808, according to an embodiment of the present disclosure. In such an embodiment the cover plate 808 attaches directly to the support portion 2000. In such an embodiment, the support portion 2000 is formed as one piece. In such an embodiment, the support portion 2000 attaches to the motor vehicle engine 1700. According to an embodiment, the left-side mid-control device 800 includes a second lever extension 2004 extending from a shift linkage 2002 to the cover support 2000 via the second lever 814. In such an embodiment, the shift linkage 2002 attaches to the motor vehicle transmission (not shown). According to an embodiment, the support portion 2000 is formed as multiple pieces.

FIG. 21 shows the left-side mid-control device 800 including a support portion 2000 comprised of multiple pieces. According to such an embodiment, the support portion 2000 engages the cover plate (not shown). According to an embodiment of the present disclosure, the left-side mid-control device 800 includes an ear portion 2100 configured to receive the pivot shaft 804. In such an embodiment, the ear portion 2100 attaches to the cover support 2000. According to an embodiment, the ear portion 2100 attaches to the second lever 814. FIG. 22 shows the left-side mid-control device 800 including an integrated unit 2200. According to an embodiment, the integrated unit 2200 combines the support portion and the cover plate into one unitary portion. According to an embodiment the support plate 2000 extends toward the pivot shaft 804 and contains an aperture to connect to the pivot shaft 804. According to an embodiment, the left actuator pedal 806 attaches to the first lever 812. In such an embodiment, the first lever 812 connects to the pivot shaft 804. In such an embodiment, the pivot shaft 804 attaches to the cover support 2000.

Figure 23:
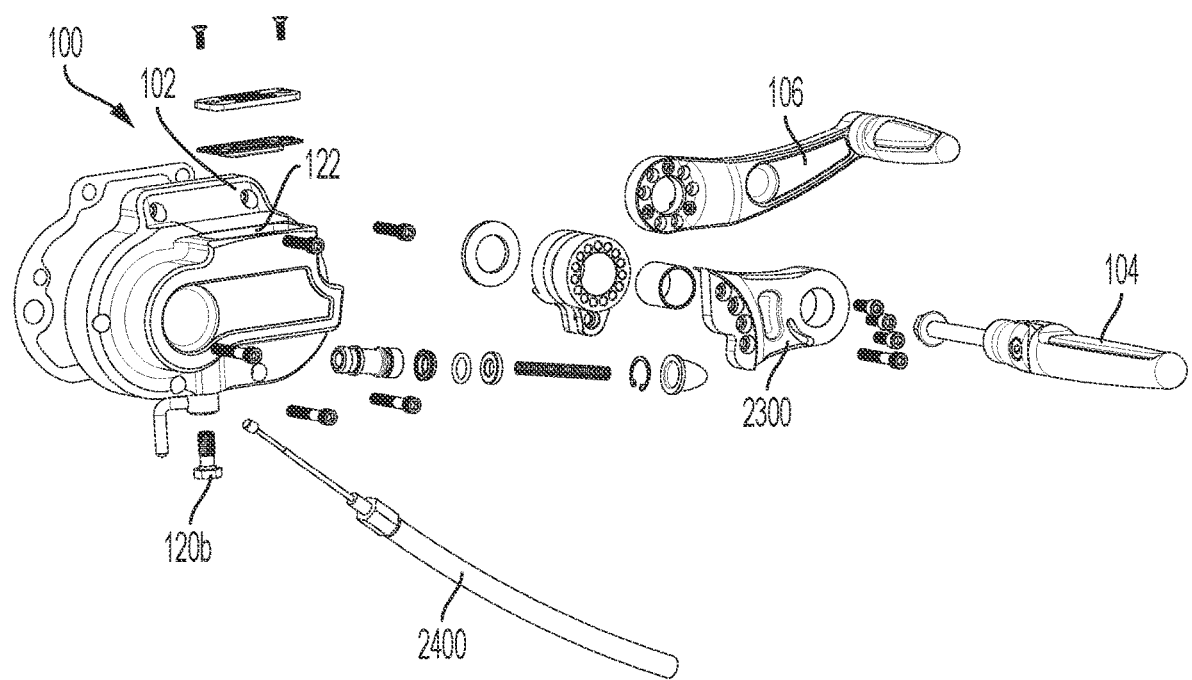
FIG. 23 shows an exploded view of a right-side mid-control device according to at least one embodiment of the present disclosure.
Figure 24:
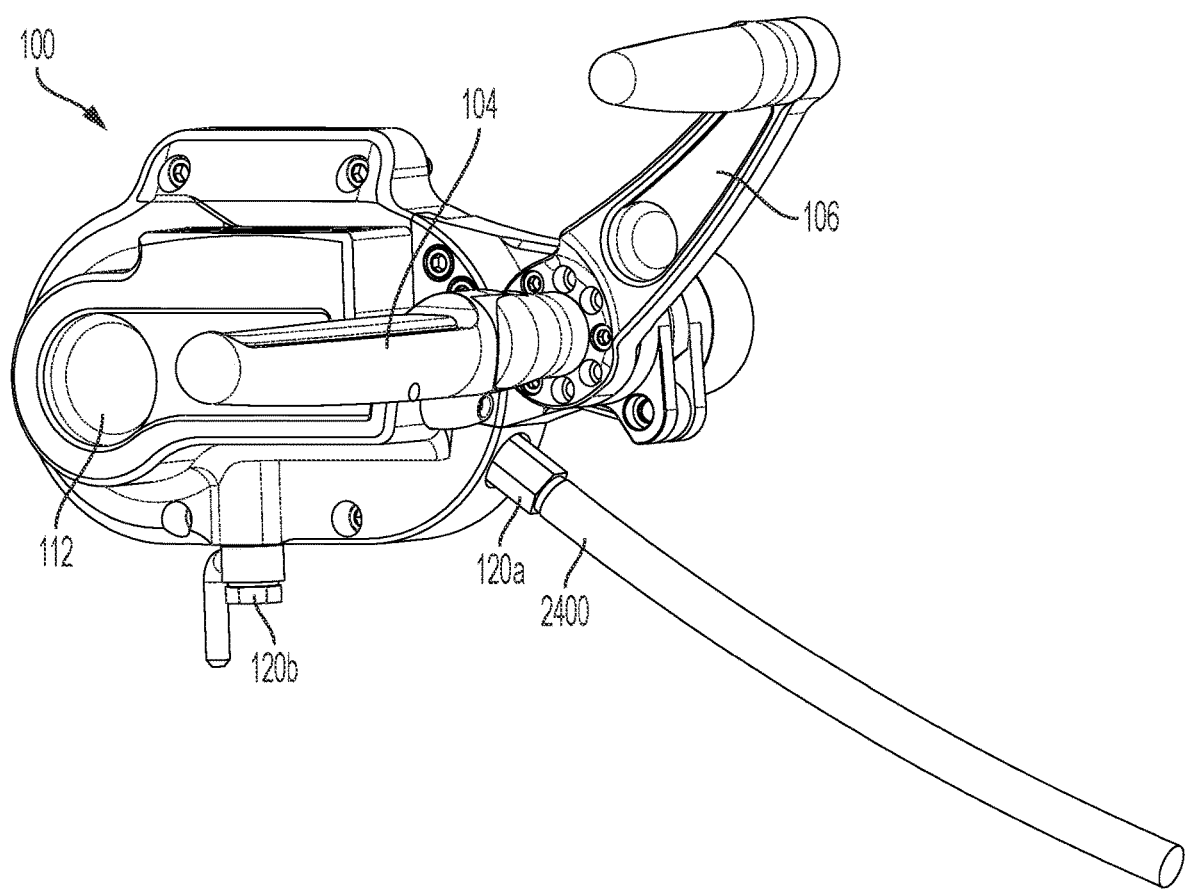
FIG. 24 shows a perspective view of a right-side mid-control device according to at least one embodiment of the present disclosure.

FIGS. 23 and 24 show a right-side mid-control device 100 according to an embodiment of the present disclosure. According to such an embodiment, the right-side mid-control device 100 is constructed of multiple pieces, which, when assembled to attach to the motor vehicle to function as one unit. In such an embodiment, the foot peg support 2300 engages the right-side footrest 104 and the housing 102, which collectively engage the transmission (not shown).

FIG. 24 shows a right-side mid-control device 100 according to an embodiment of the present disclosure. According to such an embodiment, the right-side mid-control device 100 includes a clutch cable 2400. According to such an embodiment, the clutch cable 2400 connects to the right-side mid-control device 100 and extends to the clutch (not shown) of the motor vehicle (not shown).

According to an embodiment of the present disclosure, the right-side mid-control device 100 and the left-side mid-control device 800 are positioned near the center of the motor vehicle engine 1700. Positioning the right-side mid-control device 100 and the left-side mid-control device 800 near the center of the motor vehicle engine 1700 provides a riding position that is more comfortable for certain riders and more conducive to certain types of motorcycle riding.

According to an embodiment of the present disclosure, the attachment portion of the right-side mid-control device 100 is formed as two pieces. In an aspect of such an embodiment, the two pieces of the attachment portion of the right-side mid-control device are mounted separately to the transmission of the motor vehicle engine 1700. According to another embodiment, the attachment portion of the right-side mid-control device 100 is formed as one singular piece mounted to the motor vehicle engine 1700. In such an embodiment, the right-side mid-control device 100 allows options for positioning the right-side footrest 104. According to an aspect of such an embodiment, the right-side mid-control device 100 attaches to the outer cover of the transmission of the motor vehicle engine 1700. According to an aspect of such an embodiment, the right-side mid-control device 100 comprises the outer cover of the transmission of the motor vehicle engine 1700. In an aspect of such an embodiment, the right-side mid-control device 100 comprises the hydraulic cover for the transmission of the motor vehicle engine 1700.

According to an embodiment of the present disclosure, the attachment portion of the left-side mid-control device 800 is be formed as one unitary piece. According to an embodiment, the left-side mid-control device 800 allows options for positioning the location of the left footrest 802.

According to an embodiment, the right footrest 104 and the left footrest 804 are foot pegs. According to another embodiment, the right footrest 104 and the left footrest 804 are foot boards. According to another embodiment, the right footrest 104 and the left footrest 804 are other types of rider foot supports that are known in the art.

According to an embodiment of the present disclosure, the right-side actuator pedal 106 extends away from the right-side footrest 104 toward the front of the motor vehicle engine 1700, creating a toe pedal. According to an embodiment of the present disclosure, the left actuator pedal 806 extends away from the left-side footrest 104 toward the front of the motor vehicle engine 1700, creating a toe pedal. According to an embodiment of the present disclosure, the left actuator pedal 806 extends away from the left footrest 104 toward the rear of the motor vehicle engine 1700, creating a heel pedal.

According to an embodiment of the present disclosure, manipulation of the left actuator pedal 806 results in changing gears of the motor vehicle engine 1700. According to an embodiment of the present disclosure, manipulation of the actuator pedal 806 activates the clutch of the motor vehicle engine 1700. According to an embodiment, the motor vehicle engine 1700 is a portion of a motor vehicle (not shown).

According to an embodiment, the right-side mid-control device 100 and the left-side mid-control device 800 are constructed of cast metal. According to an embodiment, the right-side mid-control device 100 and the left-side mid-control device 800 are constructed of cast steel. According to an embodiment, the right-side mid-control device 100 and the left-side mid-control device 800 are constructed of aluminum. According to an embodiment, the right-side mid-control device 100 and the left-side mid-control device 800 are constructed of billet aluminum. According to an embodiment, the right-side mid-control device 100 and the left-side mid-control device 800 are constructed of other suitable materials. According to an embodiment, the left-side mid-control device 800 and the right-side mid-control device 100 are made of a combination of suitable materials.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A mid-control system for a motor vehicle having a transmission and a primary cover opposite said transmission, said mid-control system comprising:
   a first mid-control device connected to the transmission, said first mid-control device comprising a first footrest engaged with a first actuator pedal, said first actuator pedal connected to at least one fluid reservoir containing a fluid; and
   a second mid-control device connected to the primary cover, said second mid-control device comprising a support plate, an extension with an aperture connected to the support plate, a pivot shaft connected to the extension via the aperture, and a second footrest connected to the extension and engaged with a second actuator pedal.

2. The mid-control system of claim 1, wherein the first mid-control device comprises an outer transmission cover and the fluid reservoir comprises a brake master cylinder.

3. The mid-control system of claim 1, wherein activation of the first actuator pedal applies pressure through a piston assembly and the fluid, generating stopping power for the motor vehicle.

4. The mid-control system of claim 1, wherein activation of the second actuator pedal manipulates gears of the vehicle.

5. The mid-control system of claim 1, wherein the first mid-control device further comprises an outer transmission cover with at least two connectors;
   wherein the first connector attaches to a brake line of the motor vehicle, and
   wherein the second connector attaches to a hydraulic clutch line of the motor vehicle transmission system.

6. The mid-control system of claim 1, wherein the first mid-control device further comprises an outer transmission cover with at least two connectors;
   wherein the first connector attaches to a brake line of the motor vehicle, and
   wherein the second connector attaches to a clutch cable of the motor vehicle transmission system.

7. The mid-control system of claim 1, wherein the second mid-control device further includes a cover plate.

8. The mid-control system of claim 7, wherein the support plate and cover plate are separable.

9. The mid-control system of claim 7, wherein the support plate and cover plate are provided as a single piece.

10. The mid-control system of claim 1, wherein said fluid reservoir is configured to hold brake fluid.

11. The mid-control system of claim 10, wherein said fluid reservoir is a first fluid reservoir and wherein said first mid-control device further comprises a second fluid reservoir configured to hold hydraulic fluid.

12. The mid-control system of claim 11, wherein the first fluid reservoir stores brake fluid and the second fluid reservoir stores hydraulic fluid.

13. A mid-control system for a motor vehicle having a transmission and a primary cover opposite said transmission, said mid-control system comprising:
    a first mid-control device connected to the transmission, said first mid-control device comprising a first footrest engaged with a first actuator pedal, said first actuator pedal having a first fluid reservoir configured to hold a brake fluid and a second fluid reservoir configured to hold hydraulic fluid; and
    a second mid-control device configured to connect to the primary cover, said second mid-control device comprising a pivot shaft, a second footrest engaged with a second actuator pedal.

14. The mid-control system of claim 13, wherein the first fluid reservoir stores brake fluid and the second fluid reservoir stores hydraulic fluid.

15. The mid-control system of claim 13, wherein the first mid-control device further comprises an outer transmission cover with at least two connectors; and
    wherein the first connector attaches to a brake line of the motor vehicle, and the second connector attaches to a clutch actuation of the motor vehicle transmission system.

16. The mid-control system of claim 15, wherein the clutch actuation is a hydraulic clutch line.

17. The mid-control system of claim 15, wherein the clutch actuation is a clutch cable.

18. The mid-control system of claim 15, wherein the second mid-control device further includes a cover plate.

* * * * *